Nov. 18, 1930.  E. BROBERG  1,782,132
SHADE ROLLER BRACKET
Filed July 19, 1929
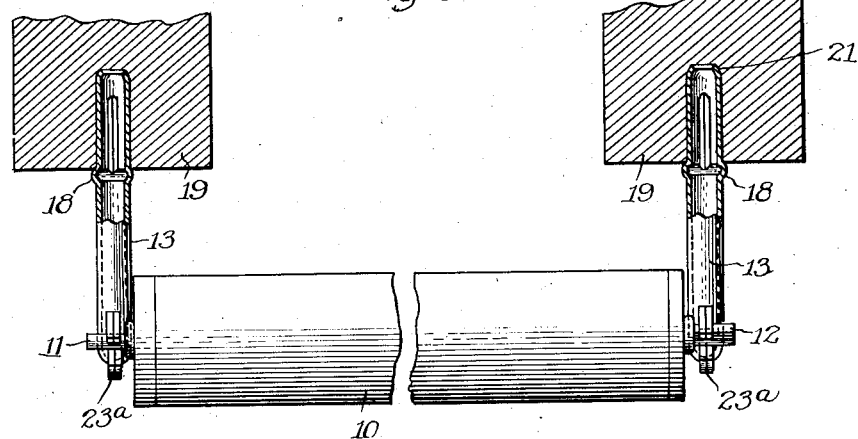
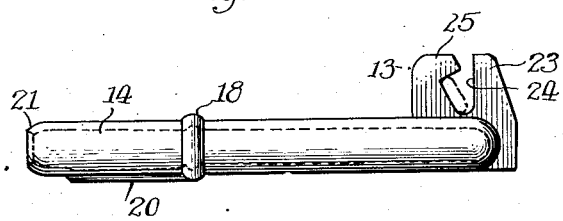
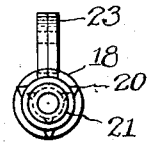
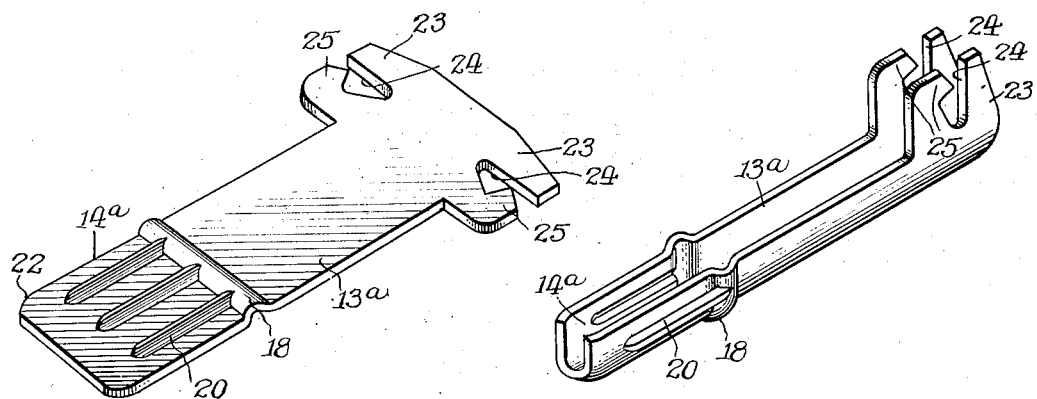
Inventor
Elmer Broberg, Patented Nov. 18, 1930

1,782,132

UNITED STATES PATENT OFFICE

ELMER BROBERG, OF ROCKFORD, ILLINOIS, ASSIGNOR TO ELCO TOOL & SCREW CORPORATION, OF ROCKFORD, ILLINOIS, A CORPORATION OF ILLINOIS

SHADE-ROLLER BRACKET

Original application filed December 14, 1927, Serial No. 239,852. Divided and this application filed July 19, 1929. Serial No. 379,353.

The invention relates to brackets particularly adapted for use in supporting window shade rollers in inwardly spaced relation to the window frame. The invention in its broader aspects is set forth and claimed in my copending application Serial No. 239,852, filed December 14, 1927, of which this application is a division.

The object of the invention is to provide a new and improved roller shade bracket of this character, which may be used interchangeably to support either end of a shade roller and which may be manufactured simply and inexpensively from a single piece of sheet metal.

Another object of the invention is to provide a bracket which may be easily, conveniently and accurately installed in place and which is inherently adapted to resist rotational displacement from its operating position.

Other objects and advantages will become apparent from the following detailed description and from the accompanying drawings, in which:

Figure 1 is a plan view partially in section illustrating the use of the bracket in supporting a roller shade away from a wall.

Fig. 2 is an elevational view of the bracket shown in Fig. 1.

Fig. 3 is an end view looking toward the right of Fig. 2.

Figs. 4 and 5 are perspective views showing the manner of forming the bracket.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In attaining the objects of the invention, a bracket has been provided which is adapted to be used interchangeably for either end of a shade roller. Since it is generally well known that one end of the ordinary shade roller 10 (Fig. 1) is provided with a round bearing pin 11, while the other end of the roller is provided with a flat pin 12 which must be held against rotation to insure the operation of the roller, it will be apparent that an interchangeable bracket must provide a receiving socket for the ends of the roller which will either provide a bearing for the round pin 11 or will engage the flat pin 12 to prevent rotation thereof.

In the preferred form, the bracket comprises an integral two part construction, one part of which provides a socket portion 13 for the reception of the pins 11, 12 on the shade roller, the other part being shaped to form a tubular anchoring stem 14 for securing the bracket in a wall. The anchoring stem has an annular bead 18 at its outer end, so positioned as to determine or designate the distance which the anchoring stem portion is to be inserted in a wall; and in order to resist any tendency of the bracket to rotate under operating conditions, one or more outwardly projecting ribs 20 are formed upon the surface of the anchoring stem 14. In the present instance the anchoring ribs are shown as extending substantially longitudinally of the stem. The end portion of the stem, as shown at 21 in Figs. 1 and 2, is slightly tapered to facilitate the driving of the bracket into a support.

Due to the construction employed for the bracket, it is especially adapted for manufacture from sheet metal in the following manner: A sheet metal blank, Fig. 4, is provided which is stamped or otherwise appropriately formed to provide the outstanding ribs 20 and the bead 18 extending thereacross and dividing the blank into the socket portion 13ª and stem portion 14ª. One end of the blank has lateral extensions 23 on opposite sides thereof which form the socket proper in the finished bracket as will presently be described.

The flat blank, after being formed in this manner, is then drawn or stamped into a substantially U-shaped member (Fig. 5), after which the side edges of the blank are drawn together to form the tubular stem 14 having a tubular continuation extending therefrom which carries the socket proper and spaces the socket an appropriate distance from the window casing.

Preferably the outer edges of the stem portion of the blank are rounded, as at 22, to provide the tapered portion 21 on the end of the stem when the stem is pressed into its tubular form. In so forming the stem it will be seen (Fig. 2) that the end wall on the tapered end will be inclined inwardly thereby presenting a substantially sharp, penetrating edge on the end of the stem.

Each of the projecting extensions 23 on the socket portion of the blank is provided with a recessed opening 24, and in the forming operation these extensions 23 are drawn into juxtaposed relation in which position the opening 24 in one extension is adapted to register with the opening in the other extension. Preferably each opening 24 is substantially V-shaped in form, and one of the legs of the V, near the outer end thereof, is provided with an extension 25 which projects inwardly of the V to provide a stop against which the pins 11, 12 may abut to prevent accidental displacement of the shade roller from the bracket.

In the installation of the device in a wall, it will be seen that it is only necessary to determine the point at which the brackets are to be mounted, drill appropriate holes at the points selected, and then drive the brackets into position. It is, of course, contemplated that the casement or window frame may be constructed of other materials than wood as, for example, metal, composition fibre or the like, without affecting the operation of the brackets in any manner. The extent to which the brackets are driven in the wall is determined by the annular bead thereon, thereby eliminating any possibility of faulty or inaccurate mounting. This is especially true in the case of the laterally extending brackets. The outwardly projecting ribs on the anchoring stem engage the framework in which the bracket is mounted and positively prevent any accidental rotation or displacement of the bracket during the operation thereof. This is also true if the brackets are to be used in conjunction with a metal casement in which instance the projecting ribs further act to bind or wedge the bracket in the opening which has been prepared in the casement.

I claim as my invention:

1. A shade roller bracket comprising a socket portion having a substantially tubular stem, an outwardly extending lug integrally connected to said stem and notched to receive the end of a shade roller, and a tubular anchoring portion formed integral with said stem.

2. A shade roller bracket comprising a socket portion and an anchoring portion formed from a single piece of sheet metal bent upon itself, said anchoring portion being tubular in form and said socket portion comprising an integrally formed lug formed at one edge of the sheet and having a recess therein open at one side to receive the end of a shade roller.

3. A shade roller bracket formed from a single piece of sheet metal to provide a tubular anchoring stem, and a substantially elongated socket portion comprising a tubular extension of said anchoring stem, and upstanding lugs at the outer end of said extension, said lugs being juxtaposed and formed with registering recesses to receive the end of a shade roller.

4. A shade roller bracket formed from a single piece of sheet metal to provide a tubular anchoring stem, and a substantially elongated socket portion comprising a tubular extension of said anchoring stem, and a part of said extension having an opening to receive the end of a shade roller, and an annular bead formed between said stem and said extension.

5. A shade roller bracket having a socket portion comprising a part bent from a flat sheet substantially into the form of a tube having a closed end, and outstanding lugs occupying a juxtaposed position at the closed end of the tube, said lugs being formed on the meeting edges of the tube to extend longitudinally of the socket and beyond the closed end of the tube and having registering recesses therein to receive the end of a shade roller.

6. A shade roller bracket for supporting the end of a shade roller comprising, in combination, a part bent from a sheet of material substantially into the form of a tube to provide a combined stem and socket-support, said tube having a closed end, and lugs having notches therein to receive the end of said shade roller, said lugs being positioned on opposed edges of said sheet adjacent the end thereof from which the closed end is formed so that the operation of bending said sheet into a tube forms a socket by effecting an abutting relation of said lugs and registration of said notches.

In testimony whereof, I have hereunto affixed my signature.

ELMER BROBERG.